Oct. 12, 1937.  W. W. DICK  2,095,242
BURNER
Filed Sept. 1, 1933  3 Sheets-Sheet 1
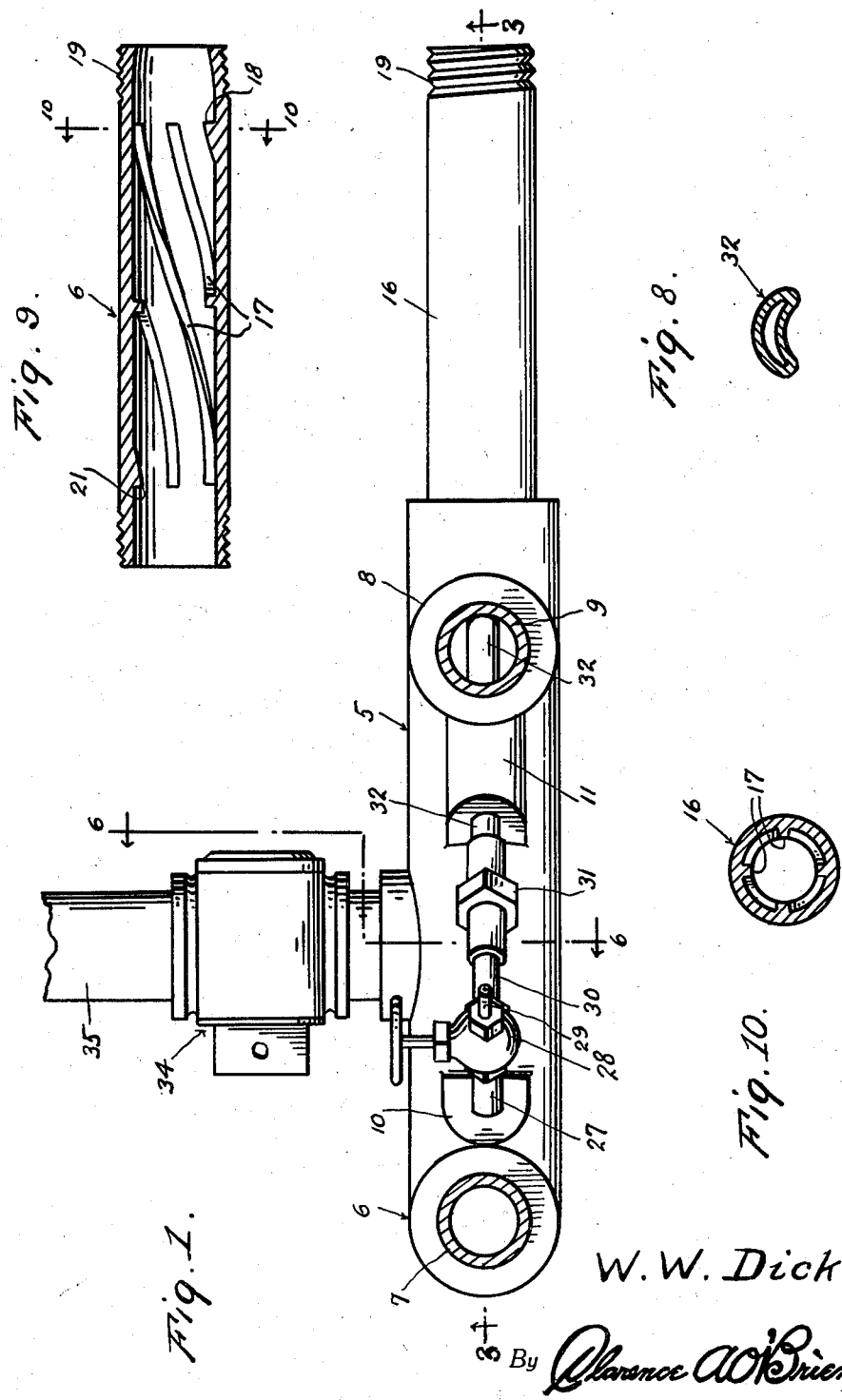
Inventor
W. W. Dick
By Clarence A. O'Brien
Attorney Oct. 12, 1937. W. W. DICK 2,095,242
BURNER
Filed Sept. 1, 1933 3 Sheets-Sheet 2
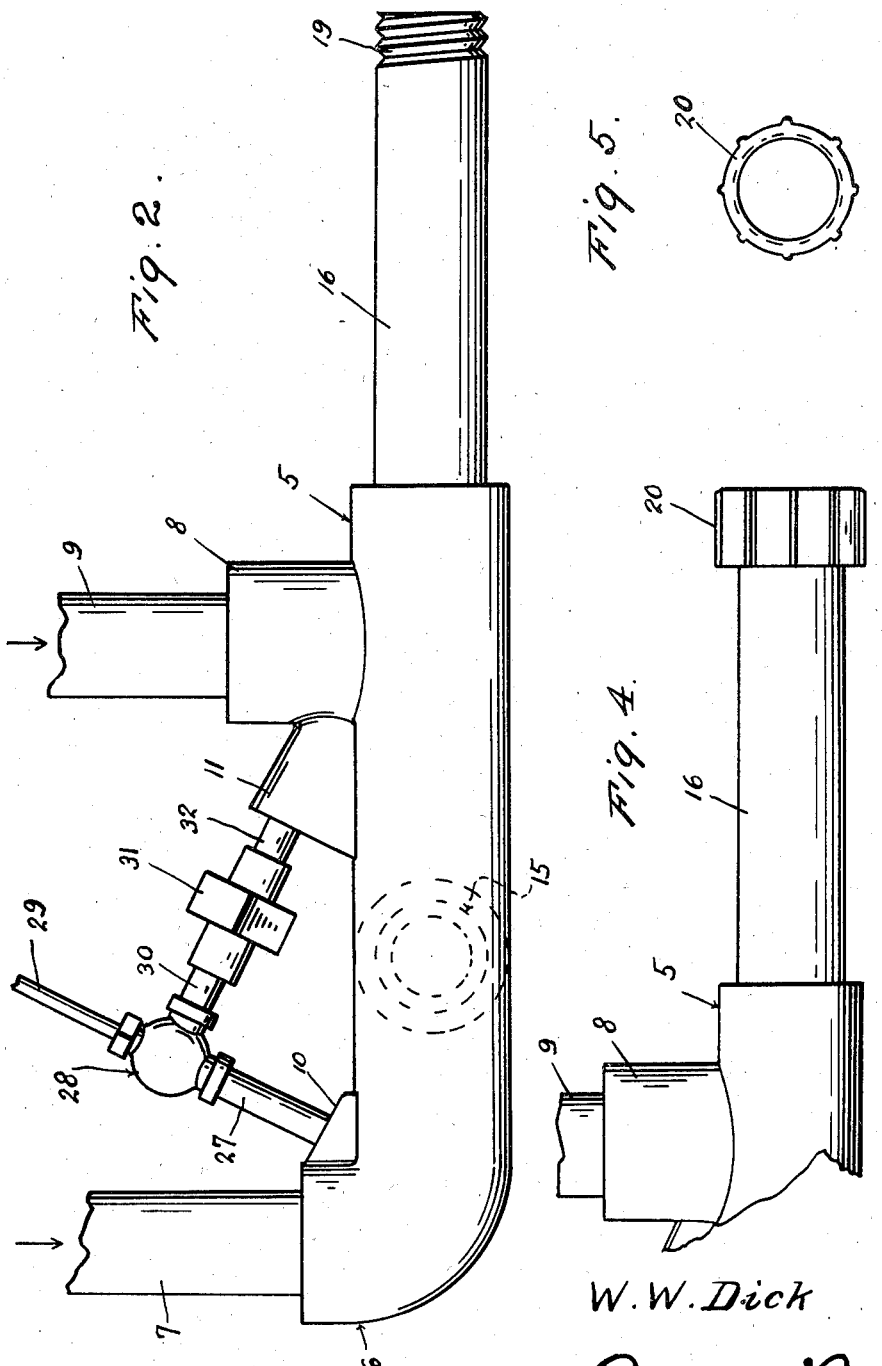
Inventor
W. W. Dick
By Clarence A. O'Brien
Attorney

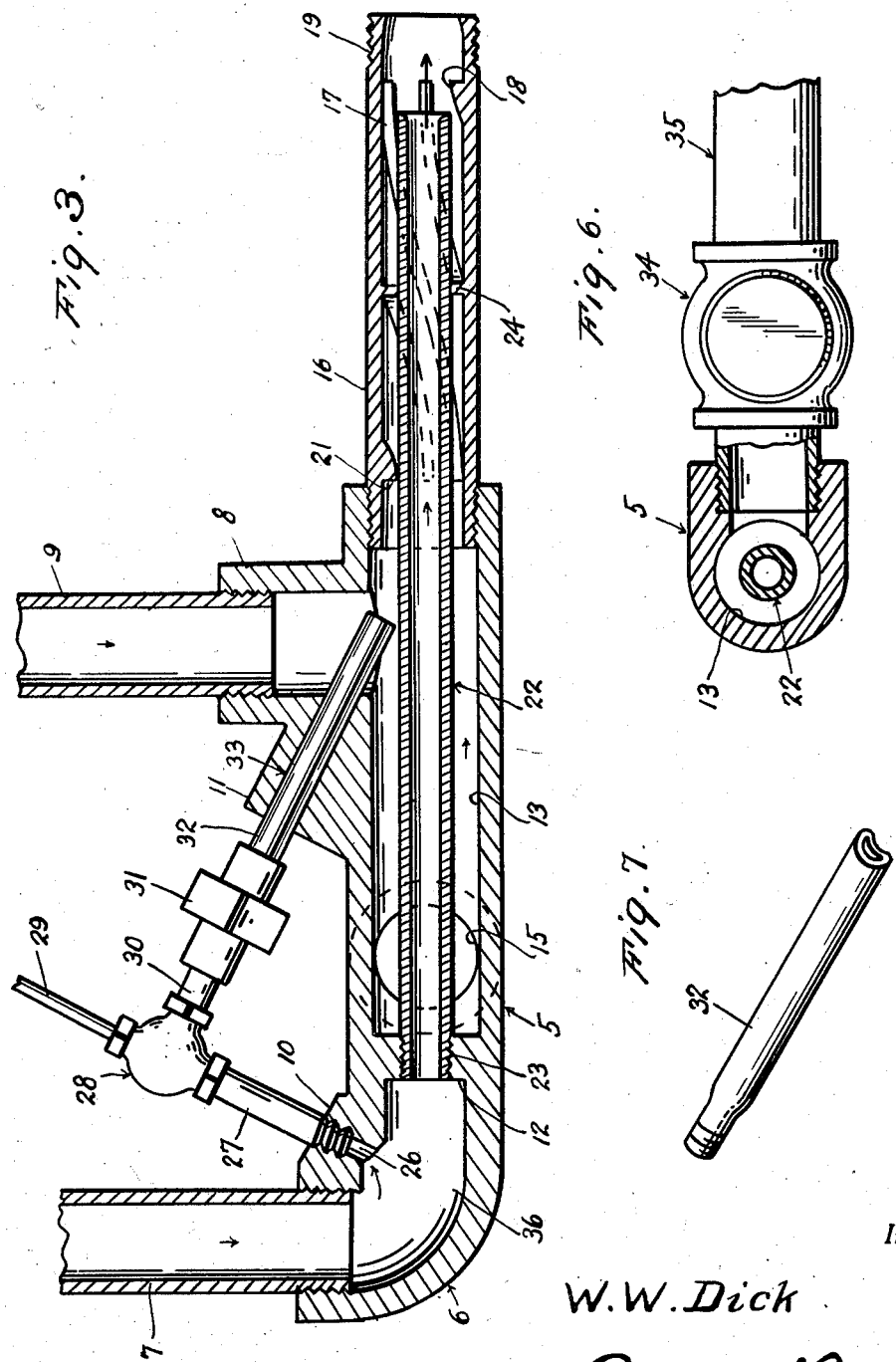

Patented Oct. 12, 1937

2,095,242

UNITED STATES PATENT OFFICE 2,095,242

BURNER

Wade W. Dick, Zwolle, La., assignor of one-half to Otto B. Bradford, Zwolle, La.

Application September 1, 1933, Serial No. 687,900

1 Claim. (Cl. 158—74)

My invention relates generally to burners, and particularly to oil burners, and an important object is to provide a burner of this class which uses less fuel, and is more simple and durable, having no moving parts, and no parts requiring delicate or frequent adjustments.

It is also an important object of my invention to provide in a burner of this class, means for liquefying the solid substances which develop within the burner and its accessories and cause the same to be consumed in the burner.

Other objects and advantages of my invention will be apparent from a reading of the following description in connection with the drawings, wherein for purposes of illustration I have shown a preferred embodiment of my invention.

Figure 1 is a top plan view of the embodiment.

Figure 2 is a side elevational view thereof.

Figure 3 is a longitudinal vertical sectional view through Figure 2.

Figure 4 is a side elevational view of the right hand end of Figure 2 showing a closure cap in position thereon.

Figure 5 is an end view of the cap in Figure 4.

Figure 6 is a transverse vertical sectional view taken through Figure 1 approximately on the line 6—6 and looking in the direction of the arrows.

Figure 7 is a perspective view of the steam jet nozzle.

Figure 8 is a transverse sectional view through Figure 7.

Figure 9 is a longitudinal vertical sectional view through the main nozzle.

Figure 10 is a transverse vertical sectional view taken through Figure 9 approximately on the line 10—10 and looking in the direction of the arrows.

Referring in detail to the drawings, wherein like numerals refer to like parts throughout the same, the numeral 5 refers generally to the casing of the burner which has at one end, that is the end outward of the furnace or the like to which the burner may be applied, an upwardly directed elbow formation 6 into which is threaded the vertical portion 7 of the steam supply pipe.

On the upper side of the casing 5 near the opposite end thereof is a vertical tubular riser 8 into which is threaded a vertical portion 9 of the fuel inlet supply pipe. Inward of the elbow portion 6 is a thickened portion 10 on the upper side of the casing, and adjacent the riser 8 is another thickened solid portion 11.

Within the casing 5 which is generally cylindrical in form is a partition 12 which defines an elongated cylindrical chamber 13 which opens through the right hand end of the casing as shown in Figure 3. As shown, the chamber 13 is of larger diameter than the interior of the elbow portion. The riser 8 communicates with the chamber 13, and near the left hand end of the chamber 13 the side wall of the casing is pierced by an air intake opening 15.

Threaded into the right hand end of the casing 5 is the barrel 16 which extends axially therefrom. The barrel 16 is provided interiorly with spiral ribs 17 in suitable number and form to produce rotation of the moving charge without unduly retarding the same. It will be observed that the interior of the barrel 16 is choked within the discharge end thereof as indicated at 18. The outer end of the barrel 16 is exteriorly threaded as indicated at 19 to receive the closure cap 20 which is to be placed thereon to close the barrel during the production of cleaning circulation in the burner for loosening and passing the incrustations and solid particles of fuel matter out of the burner.

A tube 22 of relatively small diameter has one end threaded as indicated at 23 into an opening in the partition 12 so as to be held in concentrically spaced relationship with the interior walls of the chamber 13. The choked portion 21 in the barrel 16 and the intermediate ribs 24 support the adjacent end of the tube 22, within the barrel 16, so as to define an annular passage between the tube 22 and the barrel which is modified by the presence of the ribs 17.

A pipe 27 disposed at an acute angle to the casing 5 has its depressed end threaded into an opening 26 traversing the thickened portion 10 in the elbow of the casing and has its elevated end connected to the lower end of a globe valve 28 which has the valve stem 29. The remaining arm of the globe valve 28 is coupled to a nipple 30 which is joined by a union 31 to the elevated end of a tubular member 32 which is inclined at an acute angle to the axis of the casing 5, and which passes downwardly through a receiving opening 33 in the thickened portion 11 of the casing and into the interior of the casing and has its lower end projecting partly into and across the lower end of the riser 8 and close to the upper side of the tube 22 as shown in Figure 3. The form of the tubular member 32 is shown in Figure 7.

The discharge end of the nozzle 32 has the crescent tubular cross section shown in Figure 8, so that the steam issuing therefrom is sprayed in a crescent stream having a curvature approximately that of the interior of the chamber 13 so as to initiate rotary and longitudinal movement of the steam.

The air inlet pipe 35 is closed by a shut-off valve 34 which is closed during the blowing of the steam through the fuel line in the reverse direction in the cleaning operation spoken of herein.

The steam supply pipe 7 connects to the upper end of the elbow 6 which contains the steam chamber 36 feeding the blast nozzle 22 and the by-pass nozzle 32. The steam discharging from the nozzle 32 causes a partial vacuum, with a consequent intake of air into the chamber 13 from the pipe 35. Thorough vaporization of the fuel in the nozzle is aided by a system of spiral vanes, which further atomize the oil, air and steam mixture, and give a slight rotation to the blast discharged into the combustion chamber of the furnace or the like as the vaporized mixture leaves the main nozzle, thereby distributing the burning gases more evenly over the combustion chamber of the furnace or the like, which together with the improved vaporization affords marked efficiency in the consumption of fuel and consequent economies.

As an example, a one-inch steam intake chamber 36 is choked as indicated at 12 to accommodate a ⅜ inch blast nozzle 22 and create a back pressure through a ¼ inch steam by-pass. The by-pass is equipped with a standard ¼ inch angle globe valve 28, the uses of which are indicated herein. The steam from the steam chamber 36 passes through the globe valve 28 and then through the crescent-shaped nozzle 32. By reason of the shape and arrangement of the nozzle 32 already described, there issues from the depressed end of the nozzle 32 a crescent-shaped jet of steam which strikes approximately concentrically against and around the upper side of the main blast nozzle 22, the said jet of steam striking the main blast nozzle at an acute angle to the axis of the main blast nozzle. Inasmuch as a column of air, drawn along the interior of the casing by the suction effect of the main blast nozzle, and a column of fuel is passing downwardly through the conduit 9 and around the depressed end of the steam nozzle 32 and into the interior of the casing, the columns of air and fuel meet and mingle at the point where the steam is discharged from the nozzle 32 and the effect of this is that the fuel, air and steam are more thoroughly mixed together than they would otherwise be, before the mixture is forced and drawn along the space between the blast nozzle 22 and the main nozzle 16 in which are located the spiral vanes, whereby rotary motion and final conditioning of the mixture is produced. As this mixture reaches the discharge end of the main nozzle it is blasted into the combustion chamber, or firebox of any boiler or heater, by the blast from the steam blast nozzle 22. The fuel mixture, even after it has completely entered the combustion chamber, still has a slight rotary motion, which assists in an even distribution of heat from the burning mixture over the entire heating surface of the boiler, or combustion chamber, resulting in a higher efficiency of the unit.

The ¼ inch angle valve 28 on the steam by-pass permits regulation of the flow of steam through the by-pass, which in turn regulates the amount of air inhaled by the jet action of the by-pass steam nozzle 32, whereby the most efficient use may be made of different grades of fuel. No adjustment of the valve is needed while burning the same grade of fuel, and the jet action assures an even flow of fuel, which can be supplied either from a pressure system or by a gravity feed to the intake 8, 9. The ¼ inch valve 28 must be closed when "blowing back" through the fuel line, in order to obtain the greatest efficiency of the blow-back feature of the burner. This blow-back will be discussed in detail below.

The cross-section of the steam by-pass nozzle 32 is shown in Figure 7 and when in place closely approaches the upper side of the steam blast nozzle 22 as shown and by its shape and inclination relative to the directions of flow of the incoming fuel.

The one inch shut-off valve 34 is used solely to close the air vent so as to compel the steam, when a cap 20 is placed over the main nozzle 16, to take a course through the passage between the blast nozzle and the main nozzle, in a reverse direction from which the mixture of oil, air and steam referred to above usually does, thereby compelling the steam to exit from the burner through the oil intake 8, 9 forcing any oil remaining in the supply line back into the tank or reservoir and in addition cleaning the pipe and burner of any encrustation or particles of hardened oil or paraffine, which may be clogging the same.

The main nozzle 16 is fitted with standard pipe threads on its discharge to receive a standard 1 inch pipe cap 20, whenever it is desired to use the "blow-back" feature of the burner.

Although I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claim.

What is claimed is:—

In a burner of the character described, an elongated tubular casing having an interior partition near one end defining a steam receiving chamber, the opposite end of the casing being open, said casing being provided with an air inlet and a liquid fuel inlet in its sides axially inwardly of said partition, said fuel inlet being located between said air inlet and the open end of the casing, a by-pass connecting said chamber and the interior of the open end part of said casing and including a blast nozzle discharging into said casing adjacent said fuel inlet, a main nozzle extending axially from and communicating with said open end of the casing, a blast tube extending axially through said casing and beyond said open end of the casing and having one end traversing said partition and communicating with said steam chamber, the opposite end portion of the blast tube extending into said main nozzle, said main nozzle having longitudinal interior spiral ribs spacing the interior surface thereof from the exterior of said blast tube.

WADE W. DICK.